United States Patent [19]
Suzuki et al.

[11] Patent Number: 5,494,245
[45] Date of Patent: Feb. 27, 1996

[54] WIRING HARNESS RETAINER CLIP

[75] Inventors: Yasutaka Suzuki, Northville; Tim M. Dangel, Commerce, both of Mich.

[73] Assignee: Yazaki Corporation, Tokyo, Japan

[21] Appl. No.: 237,848

[22] Filed: May 4, 1994

[51] Int. Cl.$^6$ ................................................ F16L 3/08
[52] U.S. Cl. .................... 248/74.1; 248/73; 248/68.1; 24/487
[58] Field of Search ....................... 248/75, 65, 73, 248/74.1, 74.2, 74.3, 68.1, 71; 24/487, 543

[56] References Cited

U.S. PATENT DOCUMENTS

| | | | |
|---|---|---|---|
| 4,264,047 | 4/1981 | Nelson | 248/73 |
| 4,386,752 | 6/1983 | Pavlak et al. | 248/73 |
| 4,478,381 | 10/1984 | Pittion et al. | 248/71 |
| 4,609,171 | 9/1986 | Matsui | 248/74.3 |
| 4,669,156 | 6/1987 | Guido et al. | 24/336 |
| 4,669,688 | 6/1987 | Itoh et al. | 248/74.2 |
| 4,967,924 | 11/1990 | Murofushi | 220/3.8 |
| 4,974,798 | 12/1990 | Harding et al. | 248/73 |

FOREIGN PATENT DOCUMENTS

| | | | |
|---|---|---|---|
| 2305632 | 10/1976 | France | 248/74.1 |
| 1-96723 | 6/1989 | Japan . | |
| 1-96724 | 6/1989 | Japan . | |

*Primary Examiner*—Leslie A. Braun
*Assistant Examiner*—Catherine S. Collins
*Attorney, Agent, or Firm*—Young, MacFarlane & Wood

[57] ABSTRACT

A wiring harness retainer clip for securing a wiring harness to a vehicle body panel. The retainer clip includes a first clip portion and a second clip portion connected together using one or more flexible webs. The first clip portion includes an extending axle which is pivotally engageable with an extending bushing on the first clip portion. The two clip portions are rotatable between an open position and a closed position. A mechanism is provided for securing the first clip portion to the second clip portion in the closed position. A mechanism for securing the clip assembly to the vehicle body panel is also provided.

9 Claims, 3 Drawing Sheets

5,494,245

WIRING HARNESS RETAINER CLIP

FIELD OF THE INVENTION

The present invention relates to a wiring harness retainer clip and more particularly to a wiring harness clip for securing a wiring harness to a vehicle body panel.

BACKGROUND OF THE INVENTION

FIG. 10 illustrates a prior art wiring harness retainer clip (Japanese Utility Model Preliminary Publication No. Hei-1 96723) with a living hinge 104. Living hinge 104 interconnects two semi-cylindrical clip pieces 100 and 102 and bends when the clip is opened and closed. After repeated openings and closings, living hinge 104 may fatigue and break, resulting in a loss of wire retention properties. However, this clip has the advantage of being a single piece. Thus, only one part is maintained in inventory and only a single mold is required. Moreover, use of the clip requires no assembly of separate clip pieces.

FIG. 11 discloses a two-piece hinge 201 for a junction box. The hinge pivots as two cover pieces 200 and 202 are opened and closed. This assembly is more fully described in U.S. Pat. No. 4,967,924 issued Nov. 6, 1990 to Murofushi et al. A rod 204 pivotally engages a rod holder 208 creating a hinge mechanism. This type of hinge is strong and maintains good retention properties after repeated openings and closings. However, this assembly requires two separate pieces 200 and 202 which, in turn, require two separate molds and an inventory of separate parts.

SUMMARY OF THE INVENTION

The present invention provides a wiring harness retainer clip having a strong, fatigue-resistant hinge and which is molded as a single piece. Moreover, the clip of the present invention has a compound hinge incorporating in parallel a flexible-web living hinge and a positive-contact axle-and-bushing type hinge, the latter being effectuated only when the clip pieces are moved toward the closed or juxtaposed position.

The objectives of the present invention are achieved through the use of a transverse axle rod extending from a first clip portion which interacts with a hook-shaped bushing extending from a second clip portion. The bushing and axle form a positive-contact hinge which allows the second clip portion to rotate about the first clip portion. The two clip portions are rotatable between an open position and a closed position. The positive-contact hinge is arranged in parallel with a web-type living hinge to provide a strong, secure connection between the two clip portions even after repeated openings and closings.

In a preferred form of the present invention, a pair of flexible webs hold the two clip portions together and act to guide the two clip portions toward each other in proper alignment. The webs guide the bushing on the second clip portion over the axle on the first clip portion and further acts to bias the bushing against the axle in an engaged position. From this position, the second clip portion is rotated counterclockwise to the closed position. A tab with a locking projection extends from the second clip portion and locks into a slot on the first clip portion. This locking secures the first clip portion to the second clip portion in the closed position, thereby securing the wiring harness within the retainer clip.

In the preferred form of the invention, a locking arm with a locking projection is integrally molded into the first clip portion. The locking arm projection aligns with an aperture in a mounting bracket attached to a vehicle body panel. The interaction of the locking arm projection with the aperture secures the wiring harness retainer clip to the vehicle body panel.

An optional adapter may be attached to the wiring harness to prevent the retainer clip from sliding along the wiring harness.

BRIEF DESCRIPTION OF THE DRAWINGS

For a more complete understanding of the invention, reference should be made to the accompanying drawings, in which.

DETAILED DESCRIPTION OF THE PREFERRED EMBODIMENT

Figure 1:
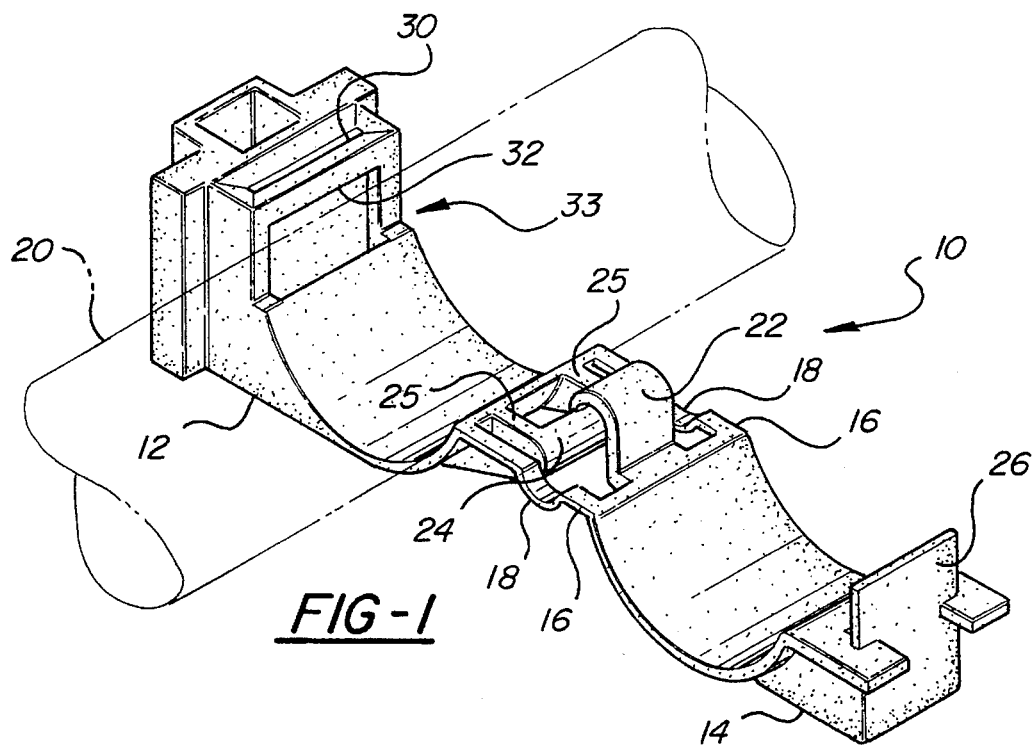
FIG. 1 is a perspective view of the wiring harness retainer clip in the open position.
Figure 2:
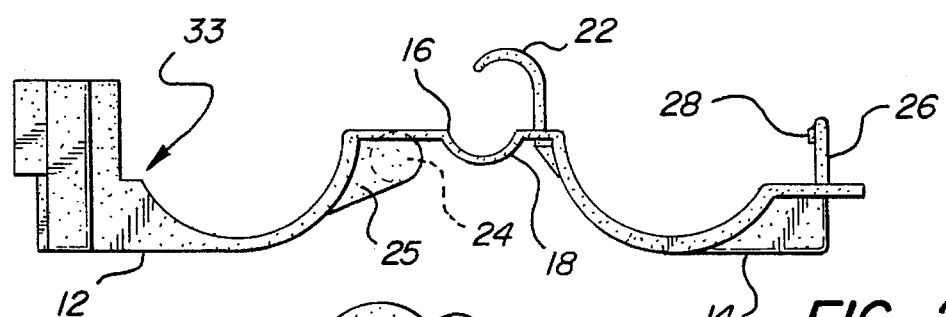
FIG. 2 is a side elevational view of the wiring harness retainer clip in the open position.

FIGS. 1 and 2 illustrate a preferred embodiment of a wiring harness retainer clip 10 for retaining a wiring harness 20 to the body of a vehicle or other structure. Typically, retainer clip 10 is used to retain large wiring harness bundles; e.g., wiring harness bundles approximately one inch in diameter. Retainer clip 10 is preferably made from Nylon 66 using an injection molding process. Nylon 66 is used because of its strength and heat resistance properties. Strength is important since retainer clip 10 is used with large wiring harnesses; heat resistance is important because retainer clip 10 may be used in the engine compartment of a vehicle. It will be understood that materials other than Nylon 66 may be used to manufacture retainer clip 10 which have similar strength and heat resistance properties.

Retainer clip 10 includes complemental first and second semi-cylindrical clip portions 12 and 14 joined at one end by parallel, spaced flexible webs 16. Webs 16 are integrally molded between clip portions 12 and 14 and form a so-called living hinge. Webs 16 include a semi-circular curved center portion 18. Since webs 16 are flexible, they are easily displaced when the two clip portions 12 and 14 are pushed toward a juxtaposed position shown in FIG. 6. Clip 10 need not be precisely circular but must approximate a closed figure when the portions 12 and 14 approach the juxtaposed position.

A second pivot or hinge in parallel with the living hinge is formed in part by a hook-shaped bushing 22 integrally molded to second clip portion 14 and extending upwardly between webs 16 and in part by a cylindrical axle 24 integrally molded to first clip portion 12 and extending between webs 16. Axle 24 is supported by support bars 25 located at each end of the axle. Support bars 25 extend from first clip portion 12 and are integrally molded between first clip portion 12 and axle 24. Bushing 22 is pivotally engageable with axle 24 to form a positive-contact hinge mechanism.

Second clip portion 14 further includes an integrally molded tab 26. Tab 26 extends upwardly and includes a locking projection 28 (shown in FIG. 2). Tab 26 is insertable into a rectangular slot 30 formed in first clip portion 12. Tab 26 is insertable into slot 30 until locking projection 28 passes an edge 32. The interaction between locking projection 28 and edge 32 locks tab 26 into slot 30, thereby locking retainer clip 10 in the closed position (shown in FIG. 6).

Figure 6:
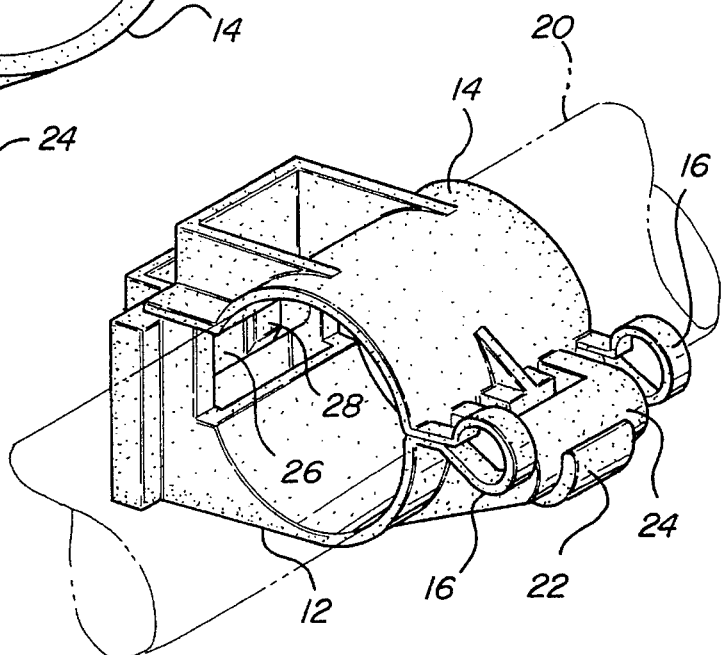
FIG. 6 is a perspective view of the wiring harness retainer clip in the closed position.
Figure 7:
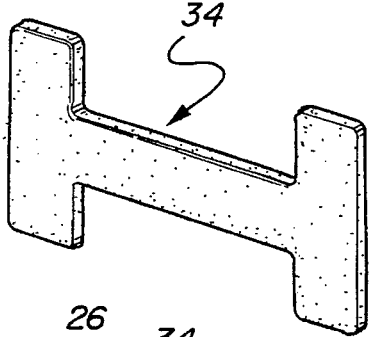
FIG. 7 is a perspective view of the optional adapter.

An adapter 34, shown in FIG. 7, includes a horizontal center section and two vertical end sections. Adapter 34 is preferably attached to wiring harness 20 when the wiring harness is assembled. Retainer clip 10 closes around adapter 34, thereby preventing the retainer clip from sliding along wiring harness 20. A recessed portion 33 (shown in FIGS. 1 and 2) is provided on first clip portion 12 parallel to slot 30 for receiving the horizontal section of adapter 34. Adapter 34 is shown in FIGS. 6 and 8 after retainer clip 10 has been secured to wiring harness 20.

Figure 8:
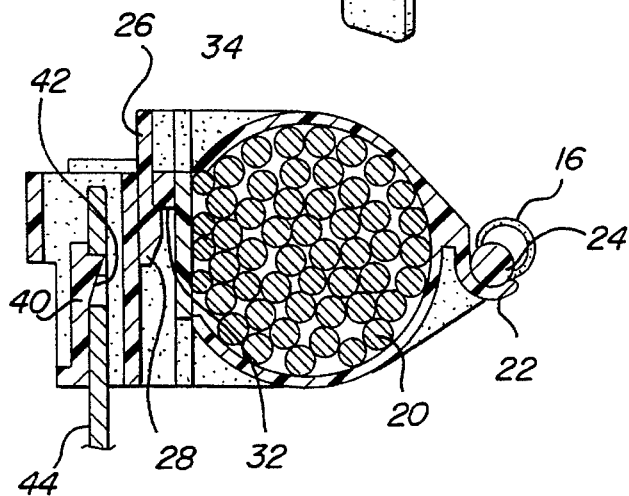
FIG. 8 is a side cross-sectional view of the wiring harness retainer clip in the closed position.
Figure 9:
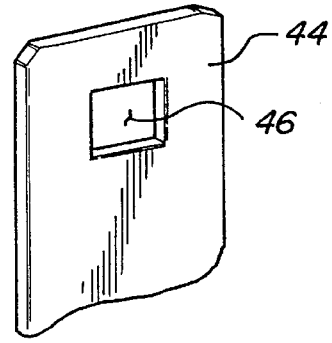
FIG. 9 is a detailed view of the vehicle body mounting bracket.
Figure 10:
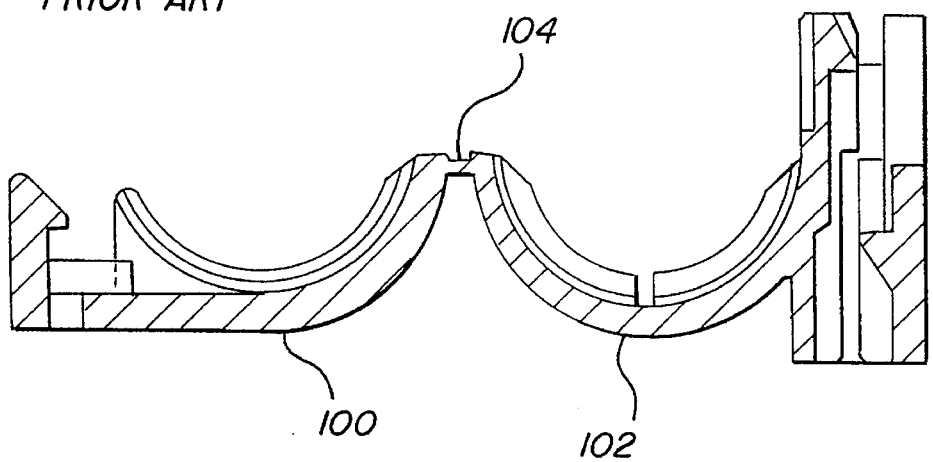
FIG. 10 is a side cross-sectional view of a prior art wiring harness retainer clip using an active hinge.
Figure 11:
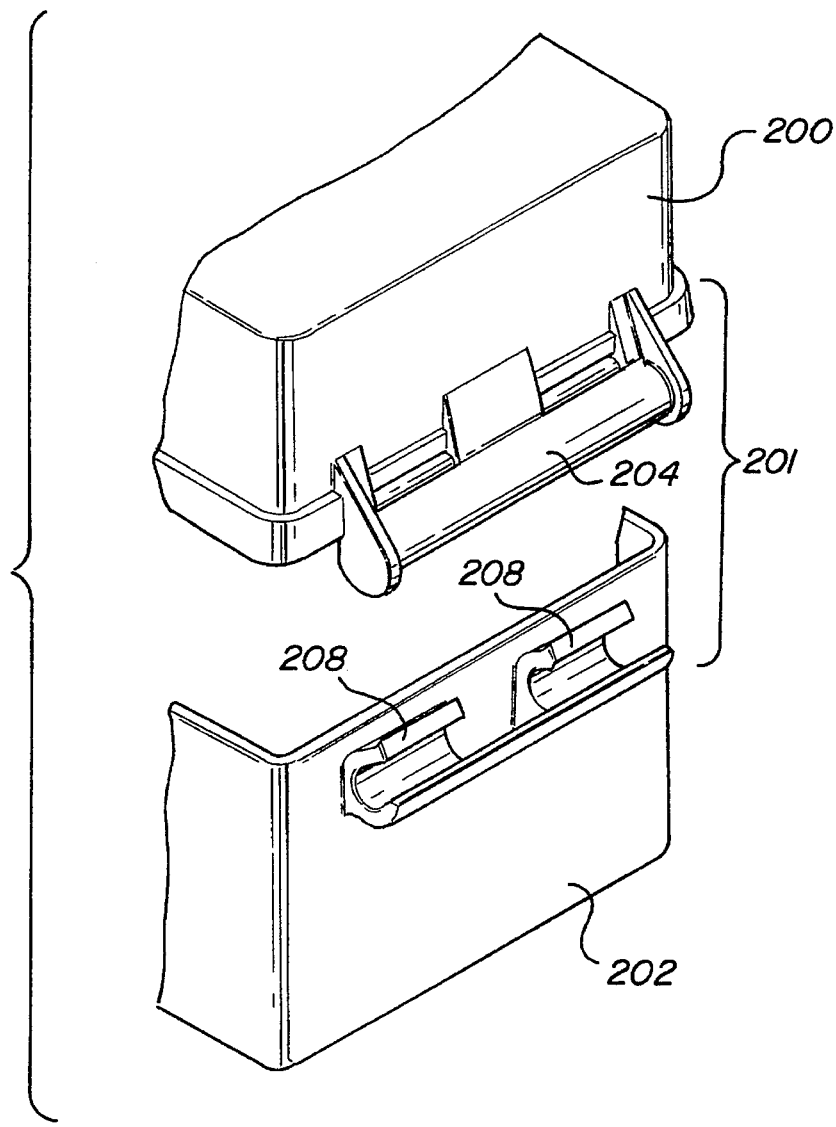
FIG. 11 is a perspective view of a prior art hinge assembly for connecting two cover pieces.

FIG. 8 shows a resilient locking arm 40 which is integrally molded to first clip portion 12. Locking arm 40 includes a locking arm projection 42. FIG. 9 shows a steel bracket 44 which is mounted to a vehicle body panel (not shown) and includes an aperture 46. Retainer clip 10 slidably mounts to bracket 44 and is secured by the engagement of locking arm projection 42 with aperture 46 in the bracket.

To assemble the inventive wiring harness retainer clip, adapter 34 (shown in FIG. 7) is first attached to wiring harness 20. In the preferred embodiment, adapter 34 is attached to wiring harness 20 using adhesive tape. The adhesive tape is of the same type which is used to wrap wiring harness 20 during manufacture of the wiring harness. Adapter 34 prevents retainer clip 10 from sliding along wiring harness 20.

In an alternate embodiment, double sided adhesive tape may be attached to the surfaces of clip 10 which contact wiring harness 20. This tape holds clip 10 to wiring harness 20 and prevents the clip from sliding along the wiring harness.

Figure 3:
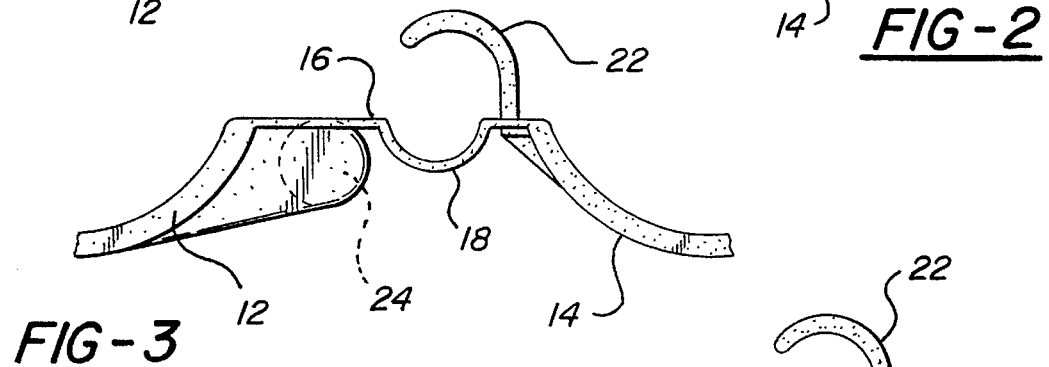
FIG. 3 is a detailed view of the bushing and axle in the open position.
Figure 4:
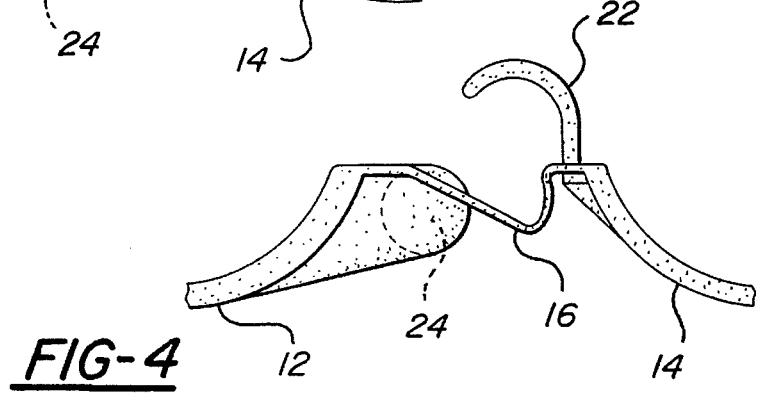
FIG. 4 is a detailed view of the bushing and axle when the two clip portions are partially pushed together.
Figure 5:
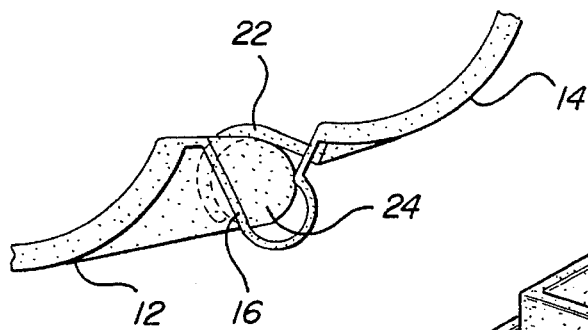
FIG. 5 is a detailed view of the bushing and axle in the engaged position.

FIGS. 2 and 3 show retainer clip 10 in the open position. To begin closing retainer clip 10, second clip portion 14 is pushed toward first clip portion 12, causing webs 16 to flex downwardly as shown in FIG. 4. The semi-circular portions 18 of webs 16 ensure that webs 16 flex downwardly. The downward flexing of webs 16 guides bushing 22 toward axle 24. As bushing 22 moves closer to axle 24, webs 16 guide bushing 22 slightly downward causing bushing 22 to engage axle 24. As bushing 22 and axle 24 engage, webs 16 cause second clip portion 14 to rotate counterclockwise approximately 45° to an engaged position shown in FIG. 5. Webs 16 bias hook 22 against rod 24 and maintain the two clip portions in the preliminary engaged position until the next assembly step.

Next, wiring harness 20 is placed in first clip portion 12. Wiring harness 20 and retainer clip 10 are positioned such that the horizontal section of adapter 34 is received by recessed portion 33 on first clip portion 12. Recessed portion 33 assures that first clip portion 12 is properly oriented on wiring harness 20.

After wiring harness 20 is positioned in first clip portion 12, second clip portion 14 is further rotated in a counterclockwise direction until tab 26 begins to enter slot 30. At this point, resistance develops because locking projection 28 is larger than slot 30. Additional pressure is applied to second clip portion 14, urging tab 26 and projection 28 into slot 30. This additional pressure causes slot 30 to bulge, allowing locking projection 28 to enter the slot. Continued pressure causes locking projection 28 to pass beyond edge 32, thereby locking clip portions 12 and 14 together, as shown in FIGS. 6 and 8. Locking clip portions 12 and 14 together secures wiring harness 20 within retainer clip 10.

After clip portions 12 and 14 are locked together, webs 16 are no longer necessary to hold the two clip portions together. Webs 16 are provided to aid with assembly by holding clip portions 12 and 14 together and guiding bushing 22 to axle 24. Webs 16 do not secure clip portions 12 and 14 when in the closed position. Instead, the positive hinge action of bushing 22 and axle 24 secure clip portions 12 and 14 together. Therefore, there is no risk of lost retention properties if webs 16 fatigue or break after clip portions 12 and 14 are locked together.

The final assembly step involves securing wiring harness retainer clip 10 to bracket 44 which is mounted to the vehicle body panel. First clip portion 12 slides over bracket 44 as shown in FIG. 8. Locking arm 40 is resiliently displaced as locking arm projection 42 slides along bracket 44. When locking projection 42 aligns with aperture 46 in bracket 44, locking arm 40 returns to its original position, thereby securing wiring harness retainer clip 10 to bracket 44. The interaction of projection 42 with aperture 46 prevents separation of retainer clip 10 from bracket 44.

It will be understood that the above assembly steps are not necessarily performed at the same time or in the same location. For example, adapter 34 may be secured to wiring harness 20 when the wiring harness is assembled. At a later time and in a different location, wiring harness retainer clip 10 may be attached to wiring harness 20. Wiring harness 20 and the attached retainer clip 10 may then be shipped to the vehicle assembly plant for installation in the vehicle and mounting of the retainer clip to bracket 44.

We claim:

1. A wiring harness retainer clip for securing a wiring harness to a vehicle body panel comprising:

first and second complementary clip portions which can be juxtaposed relative to one another to form a substantially continuous, closed figure for encircling a wire bundle;

compound hinge means for pivotally interconnecting a first end of each of said clip portions to one another comprising:

a pair of spaced apart, parallel web portions defining a living hinge, each web portion having a curved portion; and a positive contact pivot positioned intermediate said web portions, said positive contact pivot including an cylindrical axle extending from said first clip portion and a bushing extending from said second clip portion, said bushing adapted to engage said axle when said first and second clip portions are moved toward each other;

latch means adjacent a second end of each of said clip portions for locking the clip portions to one another in the juxtaposed position; and means for securing said wiring harness retainer clip to the vehicle body panel.

2. The wiring harness retainer clip as claimed in claim 1, wherein the means for locking the first clip portion and the second clip portion in the juxtaposed position comprises a tab extending from said second clip portion; and a slot in said first clip portion for receiving said tab.

3. The wiring harness retainer clip as claimed in claim 2, wherein the tab includes a locking projection extending from said tab.

4. The wiring harness retainer clip as claimed in claim 2, wherein the first clip portion includes an edge with which said locking projection interacts, locking the two clip portions together in the closed position.

5. The wiring harness retainer clip as claimed in claim 1, wherein the means for securing the clip assembly to the vehicle body panel comprises a bracket mounted to the vehicle body panel; said bracket including an aperture; and said second clip portion slidably mountable to said bracket; said second clip portion including a locking arm; said locking arm including a lock projection which engages the aperture in the bracket.

6. The wiring harness retainer clip as claimed in claim 1 further comprising a means for preventing said wiring harness retainer clip from sliding along said wiring harness.

7. A wiring harness retainer clip for securing a wiring harness to a vehicle body panel comprising:

first and second complemental clip portions which can be juxtaposed relative to one another to form a substantially continuous, closed figure for encircling a wire bundle;

a living hinge integral with a first end of each of said first and second clip portions, said living hinge comprising a pair of webs integral with said clip portions, each web including a semi-circular portion;

a positive contact pivot positioned intermediate said webs, said positive contact pivot comprising a cylindrical axle extending from said first clip portion and a bushing extending from said second clip portion adapted to engage said axle when said first and second clip portions are move toward each other;

latch means adjacent a second end of each of said clip portions for locking the clip portions to one another in the juxtaposed position; and means for securing said wiring harness retainer clip to the vehicle body panel.

8. A wiring harness retainer clip for securing a wiring harness to a vehicle body panel comprising:

first and second complemental clip portions which can be juxtaposed relative to one another to form a substantially continuous, closed figure for encircling a wire bundle;

compound hinge means for pivotally interconnecting a first end of each of said clip portions to one another and comprising the combination of a living hinge integral with said clip portions and, in parallel with said living hinge, a positive contact pivot which engages only when said clip portions are proximate the juxtaposed position;

latch means adjacent a second end of each of said portions for locking the clip portions to one another in the juxtaposed position;

means for securing said wiring harness retainer clip to a vehicle body panel; and means for preventing said wiring harness retainer clip from sliding along said wiring harness comprising an adapter attachable to said wiring harness; said wiring harness clip retainer attachable to said wiring harness and said adapter at the location of said adapter.

9. The wiring harness retainer clip as claimed in claim 8 wherein said adapter has an H shape.

\* \* \* \* \*